United States Patent
Martin et al.

(10) Patent No.: US 6,745,004 B2
(45) Date of Patent: Jun. 1, 2004

(54) SATELLITE FREQUENCY GENERATION INCORPORATING SECONDARY POWER SUPPLY

(75) Inventors: Bridget M. Martin, Torrance, CA (US); Daniel R. Lane, Santa Monica, CA (US)

(73) Assignee: Northrop Grumman Corporation, Redondo Beach, CA (US)

( * ) Notice: Subject to any disclaimer, the term of this patent is extended or adjusted under 35 U.S.C. 154(b) by 439 days.

(21) Appl. No.: 09/863,138

(22) Filed: May 22, 2001

(65) Prior Publication Data

US 2002/0177402 A1 Nov. 28, 2002

(51) Int. Cl.[7] ............................................. H04B 7/185
(52) U.S. Cl. ..................................... 455/12.1; 455/427
(58) Field of Search ............................. 455/12.1, 13.1, 455/13.2, 13.3, 13.4, 15, 16, 17, 20, 23, 22, 24, 25, 427, 75, 85, 86, 570, 571, 11.1, 428, 127.1

(56) References Cited

U.S. PATENT DOCUMENTS 5,613,229 A * 3/1997 Baranowski et al. ..... 455/127.1
6,091,934 A * 7/2000 Berman et al. ............ 455/13.4
6,633,551 B1 * 10/2003 Kent et al. .................. 370/316

OTHER PUBLICATIONS

Taha, Mohamad H. Power electronics for aircraft application Apr. 15 1999 IEE Colloquium Ref No. 059 pp.: 7/1–7/4.*

* cited by examiner

*Primary Examiner*—Nay Maung
*Assistant Examiner*—Angelica Perez
(74) *Attorney, Agent, or Firm*—Harness, Dickey & Pierce, P.L.C.

(57) ABSTRACT

A technique for providing secondary DC power to certain satellite payload components to reduce the number of secondary power converters on the satellite. A frequency generator (60) is used as a source of secondary DC power instead of providing separate secondary DC power converters. A plurality of secondary DC power lines is tapped off of the frequency generator (60) and applied to certain satellite payload components, such as LNA/DCs (18) and upconverters (42). Additionally, the secondary DC power available from the frequency generator (60) is used as a secondary DC power source for a satellite beacon assembly (62) that provides a signal to a beacon antenna (74).

19 Claims, 2 Drawing Sheets

SATELLITE FREQUENCY GENERATION INCORPORATING SECONDARY POWER SUPPLY

BACKGROUND OF THE INVENTION

1. Field of the Invention

This invention relates generally to a secondary DC power source for a satellite system and, more particularly, to a technique for using secondary DC power from a frequency generator on a satellite to provide secondary DC power to a low noise amplifier/frequency downconverter and a satellite beacon assembly.

2. Discussion of the Related Art

Various communications systems, such as certain cellular telephone systems, cable television systems, Internet systems, military communications systems, etc., make use of satellites orbiting the Earth to transfer signals. A satellite uplink communications signal is transmitted to the satellite from one or more ground stations, and then re-transmitted by the satellite to another satellite or to the Earth as a downlink communications signal to cover a desirable reception area depending on the particular use. The uplink and downlink signals are typically transmitted at different frequencies, are polarized and are coded. For example, the uplink communications signal may be transmitted at 30 GHz and the downlink communications signal may be transmitted at 20 GHz.

The satellite includes a satellite structure or bus that provides primary DC power. System components within the satellite, referred to as the satellite payload, include electrical components and systems that operate on secondary DC power, having a lower voltage than the primary DC power. For example, the primary DC power may be 50V and the secondary DC power may be 6.5V.

The satellite payload includes an antenna system having a configuration of antenna arrays that receive the uplink signals and transmit the downlink signals to the Earth. The antenna, signals received by the antenna arrays on a particular antenna channel are typically switched to another channel to be included on a downlink signal for one of a plurality of transmission antennas directed to different locations.

FIG. 1 is a schematic block diagram of a signal switching architecture 10 that provides signal switching on a satellite. The signal architecture 10 is a general depiction of this type of a system on a satellite, and it is intended to be exemplary only. The signal architecture 10 includes a series of channels 12 connected to four separate receive antennas 16. Only one of the channels 12 will be discussed herein with the understanding that the other channels operate in the same manner. The channel 12 includes a waveguide input filter 14 that filters the received uplink signal to a bandwidth in which the desired signal is contained. The filtered signal from the antenna 16 is then sent to a low noise amplifier and frequency downconverter (LNA/DC) 18 where the signal is amplified and downconverted to a lower frequency suitable for the switching operation. The LNA/DC 18 receives a local oscillator (LO) signal from a frequency generator. The LNA/DC 18 includes redundant amplification and down converting components.

Each of the amplified and downconverted signals on each channel 12 is sent to a separate splitter 26 within an input multiplexer 28. Each splitter 26 includes four outputs. The multiplexer 28 also includes a switch 30 in each channel 12 that receives an input signal from each of the splitters 26 so that the switch 30 can select which of the antennas 16 is to be connected to that channel. Therefore, all of the uplink signals for the four separate antennas 16 can be switched to any one of the channels 12. The selected antenna's 16 downconverted signal or intermediate frequency is applied to a second bandpass filter 32 where it is further filtered to remove additional noise and further limit the bandwidth. The bandwidth of the filters 32 are set to a narrow frequency band so that a particular frequency from any one of the antennas 16 can be provided on any one of the channels 12.

The multiplexer 28 further includes a plurality of transfer switches 34 that allow the signal on a particular channel 12 to be switched to another channel 12. A careful review of the switches 34 show how five channels are provided from four antennas 16. As is apparent, the center channel is a spare channel that is not connected to a bandpass filter 32, and thus is a redundant channel. By switching the transfer switches 34, the spare channel can be selectively connected to one of the two center channels in the multiplexer 28.

A signal on each channel from the multiplexer 28 is applied to a test coupler 38, and then to a channel amplifier (CAMP) 40 that provides both fixed gain and controlled gain for the signal. The signal from the amplifier 40 is then applied to a frequency upconverter (UC) 42 that frequency upconverts the downconverted frequency signal to the higher downlink frequency for transmission. The UC 42 also receives an LO signal from the frequency generator to provide the upconversion. The upconverted signal is then applied to a traveling wave tube (TWT) amplifier 44 that increases the power of the signal for transmission to the Earth. A power converter 46 receives primary satellite DC bus power (50V), and reduces the primary power to secondary DC power for each of the amplifier 40, the UC 42. It supplies a separate secondary DC voltage to the TWT amplifier 44.

The amplified signal from the TWT amplifier 44 is applied to a transfer switch 50 within an output multiplexer 52. The switches 50 receive the downlink signals from the five separate channels 12, and select the signals on these channels to be on one of the downlink channels. The signals from the switches 50 are applied to a switching network 54 that provides high power waveguide switching. The switched signals from the switching network 54 provide four separate signals where each signal from a particular downlink channel is applied to each of three switch selectors 56. Therefore, the switch selector 56 select one of the four channels to be output onto one of three separate downlink antennas 58.

A challenge in satellite design and assembly is to minimize cost, size, weight, power and integration complexity. One area in which design complexity, weight and cost can be reduced is by reducing the requirement for multiple secondary power converters. In the known signal architecture of the type disclosed in FIG. 1, the LNA/DCs 18 would operate on secondary DC power. Thus, a power converter would be required to convert the primary satellite bus DC power to the secondary DC power suitable for the LNA/DCs 18. A separate DC power converter could be provided for each one of the LNA/DCs 18, or a single DC power converter could be provided for all four of the LNA/DCs 18. Additionally, the amplifiers 40 and the UCs 42 also require secondary DC power that is provided in this example by the power converter 46.

Further, in known satellite payload architectures, a stand alone secondary DC power converter is sometimes used to provide secondary DC power to the satellite beacon assembly that provides a downlink beacon signal to the Earth for calibration purposes. In those systems where a stand alone converter was not used for this purpose, the beacon assembly included an internal secondary power converter. Thus, because secondary DC power converters are heavy and require significant satellite space and resources, the several such converters typically required in satellite payload designs added significant cost and weight to the satellite.

What is needed is a secondary DC power conversion scheme on a satellite that reduces the number of secondary DC power converters needed to reduce the cost, size, weight and integration complexity of a satellite payload. It is therefore an object of the present invention to provide such a technique.

SUMMARY OF THE INVENTION

In accordance with the teachings of the present invention, a technique for providing secondary DC power to certain satellite payload components is disclosed that reduces the number of secondary DC power converters heretofore required in the art. Particularly, a known frequency generator that provides local oscillator signals to the downconverters and Upconverters in the satellite payload is used as a source of secondary DC power, instead of providing a separate secondary power source for these components. Thus, a plurality of secondary DC power lines is tapped off of the frequency generator and applied to certain satellite payload components, such as the LNA/DCs and the upconverters. Additionally, the secondary DC power available from the frequency generator is used as a secondary DC power source for a satellite beacon assembly that provides a signal to a beacon antennal.

Additional objects, features and advantages of the present invention will become apparent from the following description and appended claims taken in conjunction with the accompanying drawings.

DETAILED DESCRIPTION OF THE PREFERRED EMBODIMENTS

The following discussion of the preferred embodiments directed to a technique for providing secondary DC power to a satellite payload is merely exemplary in nature, and is in no way intended to limit the invention or its applications or its uses.

Figure 1:
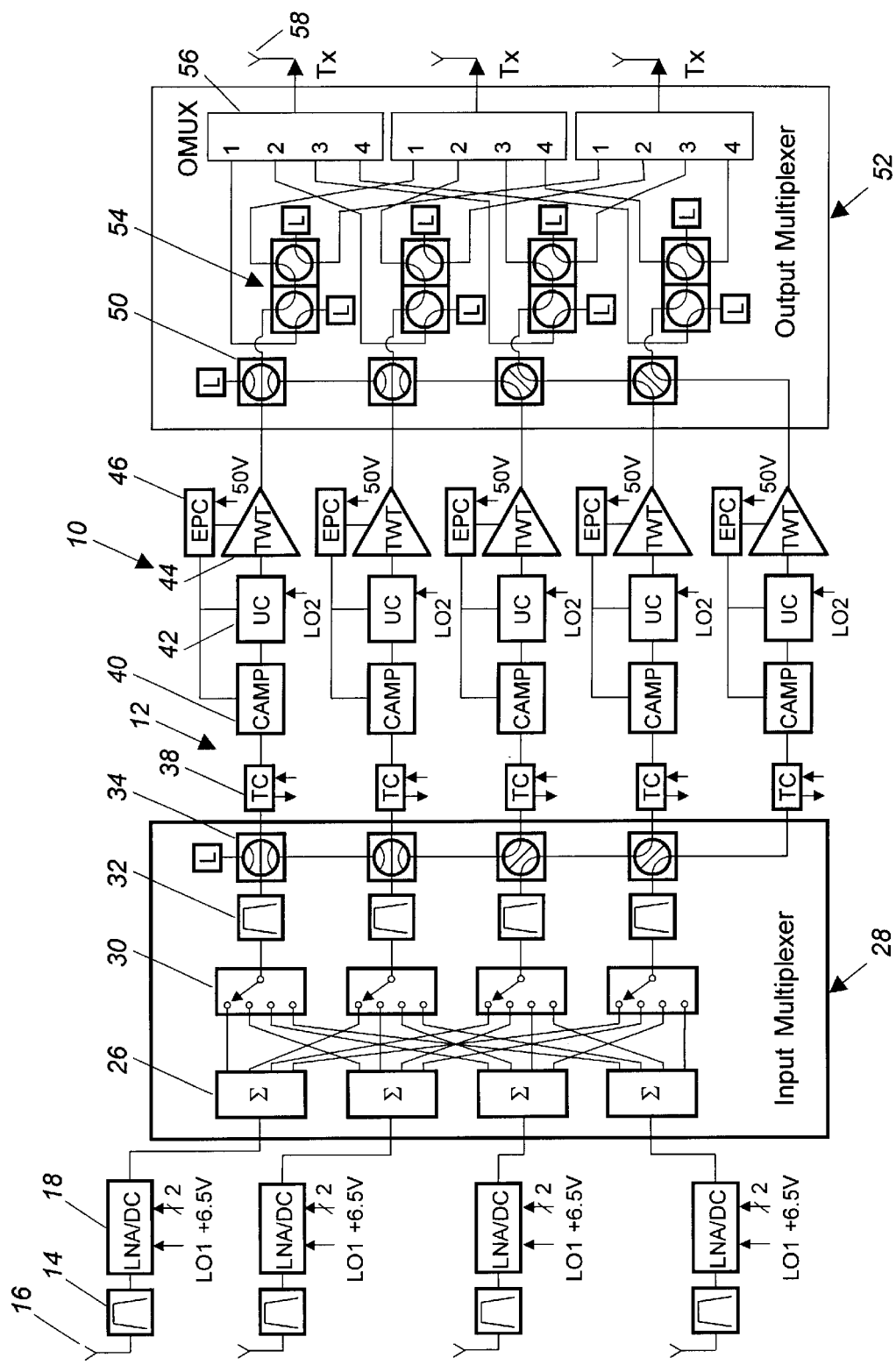
FIG. 1 is a schematic block diagram of a signal switching architecture that includes LNA/DCs being powered by a secondary DC power source internal to a frequency generator, according to an embodiment of the present invention.
Figure 2:
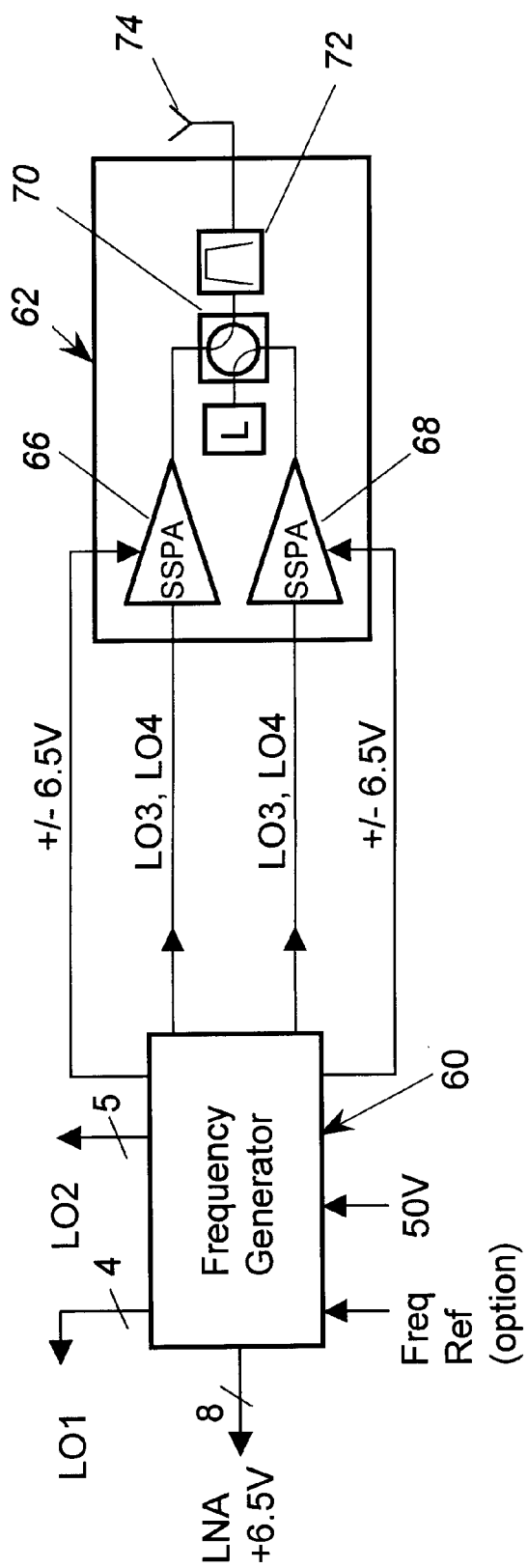
FIG. 2 is schematic block diagram of a frequency generator and satellite beacon assembly, where the frequency generator provides secondary DC power to the beacon assembly, according to the invention.

According to the invention, the known frequency generator on board a satellite of the type being discussed herein is used as a source of secondary DC power to provide secondary power to various components in the satellite payload. FIG. 2 is a schematic block diagram showing a frequency generator 60 that includes its own secondary DC power source. The frequency generator 60 is a required satellite payload system that provides LO signals to the various frequency downconverters and upconverters on the satellite, as is well understood in the art. A primary DC power signal (50V) from the satellite bus is provided to the frequency generator 60, which then converts the primary power to secondary power and outputs the secondary DC power to each of the LNA/DCs 18 in addition to the LO signals. Therefore, the stand alone secondary DC power converter normally required in the satellite to provide the secondary power to the LNA/DCs 18 can be eliminated, thus reducing the size, weight and complexity of the satellite payload. In this example, an LO1 signal is provided to each of the LNA/DCs 18 and eight 6.5V DC power signal lines are provided from the frequency generator 60 to each of the LNA/DCs 18 for both the primary and redundant components.

Although not particularly represented, the secondary DC power from the frequency generator 60 can also be applied to the UC 42 and the channel amplifier 40. Thus, the complexity of the power converter 46 can also be reduced. The frequency generator 60 is shown providing an LO2 signal to each of the UCs 42 in the five channels 12. Other satellite payload components, not particularly shown, that operate on secondary DC power can also use the the secondary power from the frequency generator 60.

The secondary power from the frequency generator 60 can also be used to drive other satellite payload elements requiring secondary power. In FIG. 2, the secondary power, here 6.5 V, from the generator 60 is applied to an antenna beacon assembly 62 that generates an antenna reference signal. In the known satellite systems, the beacon assembly 62 would include its own internal secondary DC power converter, or would receive secondary DC power from a stand alone secondary DC power source. According to the invention, these power sources are eliminated from the satellite payload, and the already existing secondary DC power source within the frequency generator 60 is used as the source of secondary DC power for the assembly 62. The LO signals from the frequency generator 60 are also applied to the beacon assembly 62 that is used to provide the reference beacon signals.

The beacon assembly 62 includes first and second solid state power amplifiers (SSPA) 66 and 68, where the SSPA 68 is a redundant amplifier. The amplified LO signals from the SSPA 66 and 68 are applied to an isolator switch 70 that selects the output from the SSPA 66 in its normal mode. If the SSPA 66 fails, then the switch 70 switches to the SSPA 68. The amplified signal from the SSPA 66 is then applied to a waveguide beacon bandpass filter 72 that filters the signal to a particular reference frequency, that is then output on a beacon antenna 74. The frequency generator 60 provides two separate local oscillator signals LO3 and LO4 to the SSPAs 66 and 68 for comparison purposes.

The foregoing discussion discloses and describes merely exemplary embodiments of the present invention. One skilled in the art will readily recognize from such discussion, and from the accompanying drawings and claims, that various changes, modifications and variations can be made therein without departing from the spirit and scope of the invention as defined in the following claims.

What is claimed is:

1. A satellite system including a satellite bus providing primary power and satellite payload components operating on secondary DC power, said system comprising:

a frequency generator for generating a plurality of local oscillator signals, said frequency generator being responsive to a primary power signal from the satellite bus and generating secondary DC power signals; and an antenna beacon assembly for generating a satellite beacon signal, said satellite beacon assembly being responsive to local oscillator signals from the frequency generator and secondary DC power signals from the frequency generator.

2. The system according to claim 1 wherein the antenna beacon assembly includes a first power amplifier and a second power amplifier, said second power amplifier being a redundant power amplifier, said first and second power amplifiers being responsive to local oscillator signals from the frequency generator and the secondary DC power signals from the frequency generator.

3. The system according to claim 1 further comprising at least one low noise amplifier and frequency downconverter for amplifying and downconverting a received signal from a receive antenna, said low noise amplifier and frequency downconverter being responsive to a local oscillator signal from the frequency generator and a secondary DC power signal from the frequency generator.

4. The system according to claim 3 wherein the at least one low noise amplifier and frequency downconverter is at least four low noise amplifiers and frequency downconverters, each receiving a local oscillator signal from the frequency generator and a secondary DC power signal from the frequency generator.

5. The system according to claim 1 further comprising at least one upconverter, said at least one upconverter being responsive to a local oscillator signal from the frequency generator and a secondary DC power signal from the frequency generator.

6. The system according to claim 1 further comprising at least one channel amplifier, said at least one channel amplifier receiving a secondary DC power signal from the frequency generator.

7. A satellite system including a satellite bus providing primary power and satellite payload components operating on secondary DC power, said system comprising:
   a frequency generator for generating a plurality of local oscillator signals, said frequency generator being responsive to a primary power signal from the satellite bus and generating secondary DC power signals; and
   at least one low noise amplifier and frequency downconverter for amplifying and downconverting a received signal from a receive antenna, said low noise amplifier and frequency downconverter being responsive to a local oscillator signal from the frequency generator and a secondary DC power signal from the frequency generator.

8. The system according to claim 7 wherein the at least one low noise amplifier and frequency downconverter is at least four low noise amplifiers and frequency downconverters, each receiving a local oscillator signal from the frequency generator and a secondary DC power signal from the frequency generator.

9. The system according to claim 7 further comprising at least one upconverter, said at least one upconverter being responsive to a local oscillator signal from the frequency generator and a secondary DC power signal from the frequency generator.

10. The system according to claim 7 further comprising at least one channel amplifier, said at least one channel amplifier receiving a secondary DC power signal from the frequency generator.

11. A satellite including a satellite bus providing primary power and satellite payload components operating on secondary DC power, said satellite comprising:
   a frequency generator for generating a plurality of local oscillator signals, said frequency generator being responsive to a primary power signal from the satellite bus and generating secondary DC power signals; and
   at least one satellite payload component other than the frequency generator that operates on secondary DC power, said at least one payload component being responsive to a secondary DC power signal from the frequency generator.

12. The satellite according to claim 11 wherein the at least one satellite payload component is selected from the group consisting of upconverters, downconverters, amplifiers and beacon assemblies.

13. A method of providing secondary power to satellite payload components in a satellite, said method comprising the steps of:
   providing a frequency generator for generating local oscillator signals;
   applying a primary power signal from a satellite bus to the frequency generator;
   converting the primary power signal to a secondary DC power signal in the frequency generator;
   providing a local oscillator signal from the frequency generator to at least one of the payload components; and
   providing a secondary DC power signal from the frequency generator to at least one of the payload components.

14. The method according to claim 13 wherein the steps of providing a local oscillator signal and a DC power signal include providing a local oscillator signal and a DC power signal to an antenna beacon assembly.

15. The method according to claim 14 wherein the steps of providing the local oscillator signal and the secondary DC power signal to the antenna beacon assembly include providing the local oscillator signal and the secondary DC power signal to a first power amplifier and a second power amplifier in the antenna beacon assembly, said second power amplifier being a redundant power amplifier.

16. The method according to claim 13 wherein the steps of providing a local oscillator signal and a secondary DC power signal include providing a local oscillator signal and a secondary DC power signal to at least one low noise amplifier and frequency downconverter.

17. The method according to claim 16 wherein the steps of providing the local oscillator signal and the secondary DC power signal to the at least one low noise amplifier and frequency downconverter include providing a local oscillator signal and a secondary power signal to four low noise amplifiers and frequency downconverters.

18. The method according to claim 13 wherein the steps of providing a local oscillator signal and a secondary DC power signal include providing the local oscillator signal and the secondary DC power signal to at least one frequency upconverter.

19. The method according to claim 13 wherein the step of providing a secondary DC power signal includes providing a secondary DC power signal to at least one channel amplifier.

* * * * *